J. B. HUPPERT.
STEAM TABLE.
APPLICATION FILED JUNE 25, 1910.
1,011,061.
Patented Dec. 5, 1911.
2 SHEETS—SHEET 1.
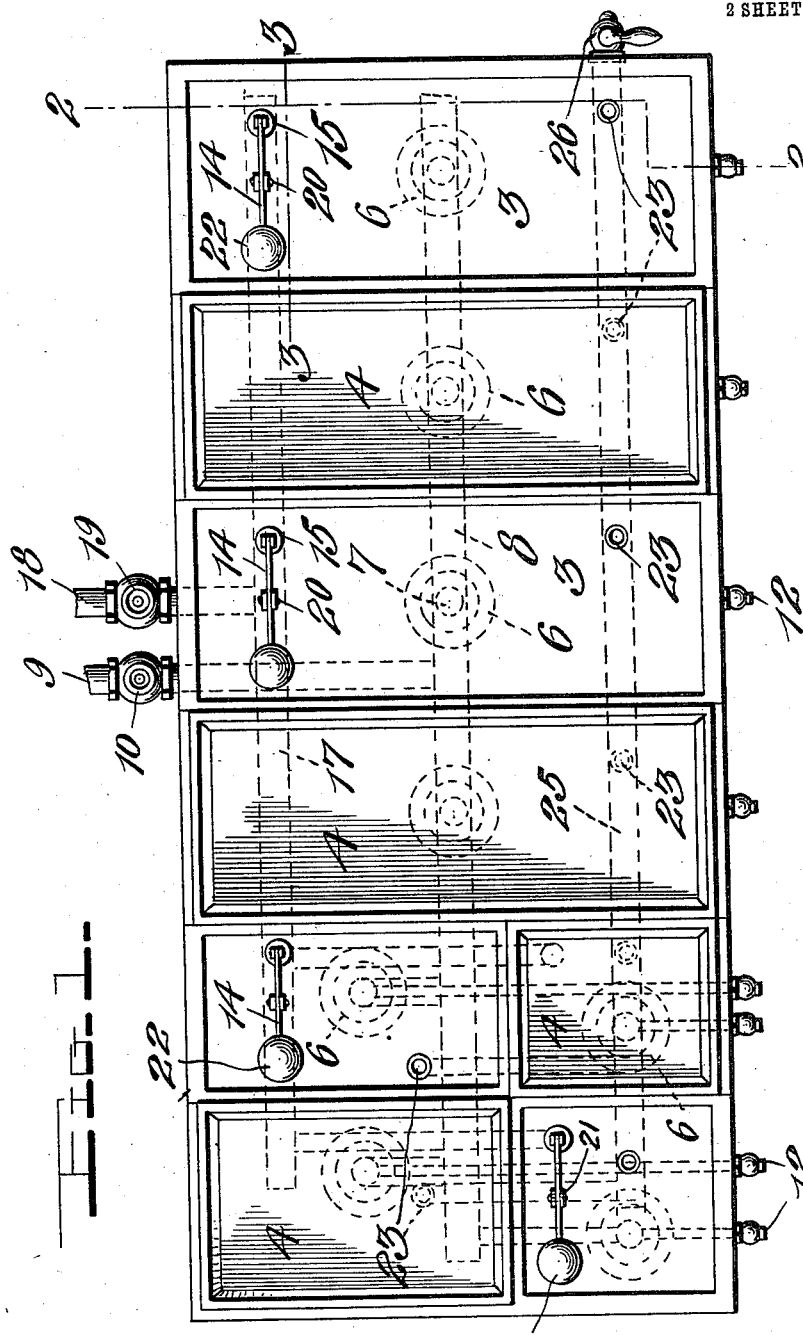
Witnesses
Chas. L. Grieshauer.
H. L. McDual
Inventor
J. B. Huppert,
By Watson E. Coleman,
Attorney

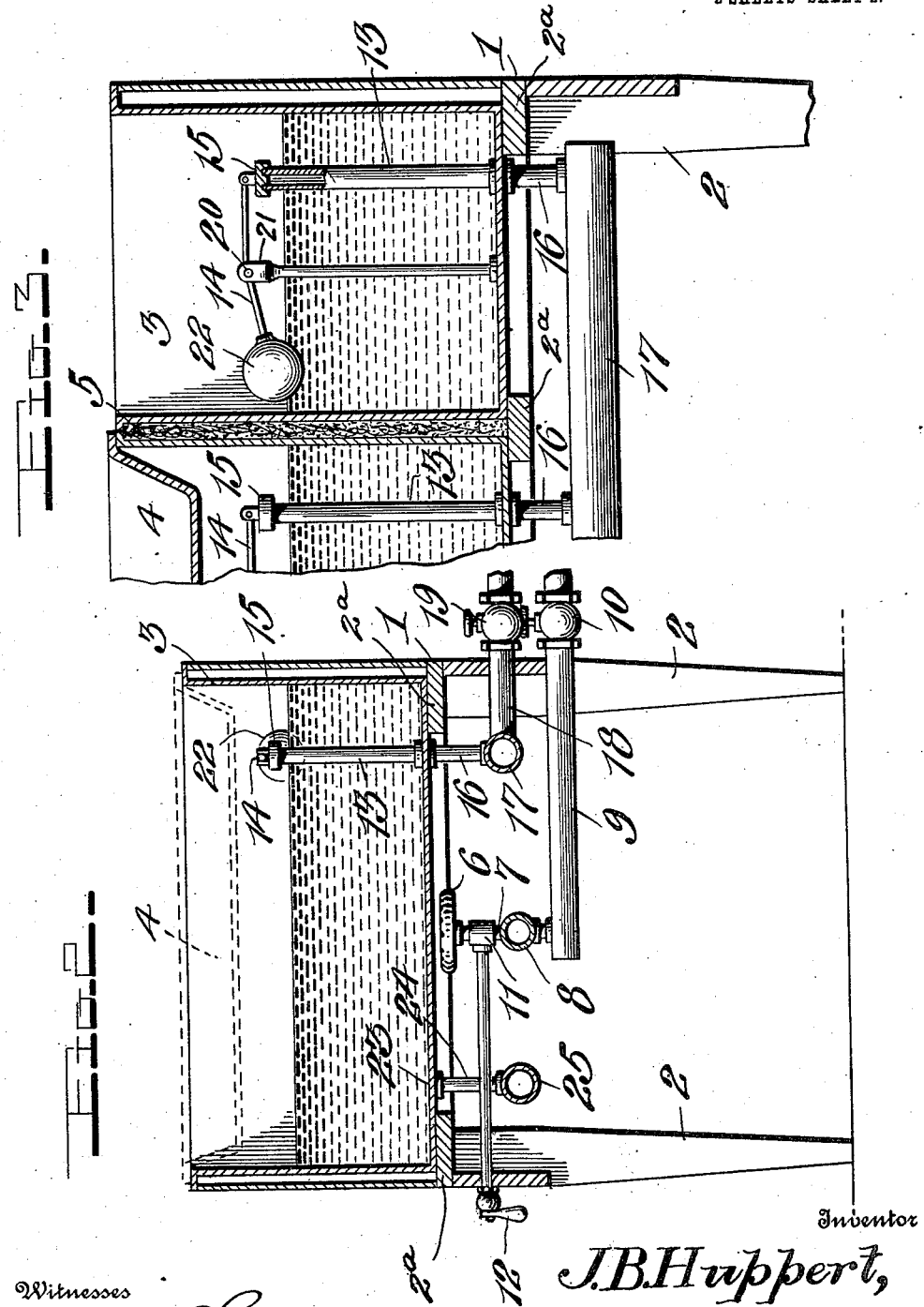

UNITED STATES PATENT OFFICE.

JOHN B. HUPPERT, OF PITTSBURGH, PENNSYLVANIA.

STEAM-TABLE.

1,011,061.  Specification of Letters Patent.  Patented Dec. 5, 1911.

Application filed June 25, 1910. Serial No. 568,855.

*To all whom it may concern:*

Be it known that I, JOHN B. HUPPERT, a citizen of the United States, residing at Pittsburgh, in the county of Allegheny and State of Pennsylvania, have invented certain new and useful Improvements in Steam-Tables, of which the following is a specification, reference being had to the accompanying drawings.

This invention relates to improvements in steam tables, used for keeping food warm in lunch rooms, hotels, etc.

One object of my invention is to provide a steam table of such construction that different portions of it may be quickly heated without heating other portions thereby effecting a great saving in gas and time when the entire table is not needed.

Another object of my invention is to provide a steam table with improved means for maintaining a constant level of water within its chamber or chambers.

With the above and other objects in view, the invention consists of the novel features of construction and the combination and arrangement of parts hereinafter fully described and claimed, and illustrated in the accompanying drawings, in which—

Figure 1 is a plan of my improved steam table, certain of the trays being removed to disclose the water receptacles, and the water supply means for said receptacles; and Figs. 2 and 3 are detail vertical and longitudinal transverse sectional views taken, respectively, on the planes indicated by the lines 2—2 and 3—3 in Fig. 1.

My improved steam table comprises a main frame or table 1, here shown as of rectangular shape, and supported by legs 2. The said main frame is provided with a series of spaced cross bars 2ª. On top of the frame or support 1, is arranged a series of united water and steam receptacles 3, here shown in the form of rectangular sheet metal pans having open tops on which are removably supported the food pans or trays 4. The said steam receptacles are arranged side by side, disposed on the cross bars of the frame, and their opposing sides are provided at their upper edges with flanges which space them apart as shown in Fig. 3.

Any number of the pans or receptacles 3 may be provided and they may be of any suitable shape and arranged in any desired manner, each being entirely separate from the others. These pans or receptacles 3 form a plurality of chambers to contain the hot water and steam and in order to prevent the radiation of heat from one chamber to the next adjacent chamber, lining members 5 of asbestos or other heat insulating material are arranged between said pans. The insulating lining members rest on the cross bars 2ª of the frame 1, and are covered by the side flanges with which the water and steam receptacles 3 are provided. As illustrated in Fig. 1, the table consists of four long pans or receptacles which extend from front to rear of the table 1, and four smaller pans, the latter being arranged at one end of the device.

For the purpose of heating the water in the pans or chambers 3, a gas burner 6 of any suitable form and construction is arranged beneath each of the same and connected by a branch pipe 7 to a main gas supply pipe 8, the latter extending longitudinally beneath the table 1, and having connected to its center, a supply pipe 9, containing a cut-off and regulating valve 10. Each of the burners 6 is controlled by a valve 11, the stem 26 of which is actuated by a suitable hand piece 12, arranged at the front of the table 1.

For the purpose of maintaining a constant level of water in the pans or chambers 3, I provide each one with a water inlet pipe 13, and a flushing device consisting of a float actuated lever 14 carrying a valve 15 to open and close the open upper end of one of the pipes 13. These inlet pipes 13 extend vertically through the bottoms of the chambers 3, and are connected by branch pipes 16 to a longitudinally arranged supply pipe 17. The latter is connected to a main supply pipe 18, containing a cut-off and controlling valve 19. The lever 14 is fulcrumed intermediate its ends as shown at 20, on the upper end of a standard 21, arranged in one of the chambers or pans 3. At one end of the lever is suitably secured a float 22, and at its other end is fixed the valve 15, the latter being in the form of a disk like member arranged on the lever so as to seat on the upper end of the pipe 13, as shown more clearly in Fig. 4 of the drawings.

To permit the several pans or chambers 3 to be drained for cleaning purposes or repairs, each one is provided in its bottom with an outlet 23, connected by a branch pipe 24 to a longitudinally extending waste pipe 25, the latter having at one end of the table, a spigot 26.

From the foregoing it will be seen that my invention provides a steam table adapted for use in the home as well as in very large or small dining rooms, hotels, etc.; and that owing to the peculiar construction, the table may be effectively operated at a small expense and with very little attention. Owing to the separation of the different portions of the table, and the provision of a separate burner for heating each pan or section, only a portion of the table may be heated when the entire table is not needed, thereby effecting a saving in gas and in time necessary to bring the water to proper temperature. The provision of the float controlled valve or flushing device insures a constant or standard level of water in each chamber of the table, so that no attention on the part of the operator will be necessary to insure sufficient water being in the table to prevent overheating of the food. It will be seen that when the level of the water in any particular chamber drops below a predetermined point, the float lowers with the level of the water and thereby opens the valve to permit water to enter the compartment through the inlet pipe; and that when the level of the water is restored, the float causes the valve to close the inlet pipe.

Having thus described the invention what is claimed is:

The herein described steam table comprising a supporting frame having spaced cross bars, a series of non-communicating water receptacles on the said frame of the support, arranged side by side, and having their opposing sides provided with flanges spacing them apart, the sides of the said receptacles resting on the said cross bars of the frame, means for heating said receptacles, and insulating linings between the said receptacles, disposed on the cross bars thereof and between the opposing sides of the said water receptacles.

In testimony whereof I hereunto affix my signature in the presence of two witnesses.

JOHN B. HUPPERT.

Witnesses:
 Max H. Srolovitz,
 J. V. Brooks.

---

Copies of this patent may be obtained for five cents each, by addressing the "Commissioner of Patents, Washington, D. C."